(12) United States Patent
Chen

(10) Patent No.: US 10,193,436 B2
(45) Date of Patent: Jan. 29, 2019

(54) SWITCHING POWER SUPPLY APPARATUS

(71) Applicant: FUJI ELECTRIC CO., LTD., Kawasaki-shi (JP)

(72) Inventor: Jian Chen, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 673 days.

(21) Appl. No.: 14/250,868

(22) Filed: Apr. 11, 2014

(65) Prior Publication Data

US 2014/0313787 A1  Oct. 23, 2014

(30) Foreign Application Priority Data

Apr. 19, 2013  (JP) .................................. 2013-088317

(51) Int. Cl.
| | |
|---|---|
| *H02M 1/32* | (2007.01) |
| *H02M 3/335* | (2006.01) |
| *H02M 3/337* | (2006.01) |
| *H02M 1/00* | (2006.01) |

(52) U.S. Cl.
CPC .......... *H02M 1/32* (2013.01); *H02M 3/3376* (2013.01); *H02M 3/33523* (2013.01); *H02M 2001/0019* (2013.01); *H02M 2001/0058* (2013.01); *Y02B 70/1416* (2013.01); *Y02B 70/1433* (2013.01); *Y02B 70/1491* (2013.01)

(58) Field of Classification Search
CPC .......... H02M 1/32; H02M 1/36; H02M 3/335; H02M 3/33507; H02M 3/33538; H02M 3/33546; H02M 3/33553; H02M 3/33569; H02M 3/337; H02M 3/3376; H02M 2001/0019; H02M 2001/0058; Y02B 70/1416; Y02B 70/1433; Y02B 70/1491
USPC .......................................... 363/21.01–21.18
See application file for complete search history.

(56) References Cited

U.S. PATENT DOCUMENTS 4,078,247 A * 3/1978 Albrecht ............... H02M 7/525
                                                     363/96
5,583,424 A   12/1996 Sato et al.
6,087,782 A    7/2000 Majid et al.
(Continued)

FOREIGN PATENT DOCUMENTS

JP      07-236271 A    9/1995
JP      2002-064976 A  2/2002
(Continued)

*Primary Examiner* — Timothy J Dole
*Assistant Examiner* — Ivan Laboy Andino
(74) *Attorney, Agent, or Firm* — Rabin & Berdo, P.C.

(57) ABSTRACT

A switching power supply apparatus, including a power converting device body configured to switch DC input power through a first switching element to thereby store the DC input power in an inductor, and to transfer the stored power to an output capacitor through a second switching element by use of resonance of the inductor, a control circuit configured to drive the first and second switching elements to alternately turn ON or OFF the two switching elements, to thereby resonate the inductor, and an overload detecting circuit configured to detect a load state of the power converting device body based on a peak value or an effective value of a resonance voltage generated from the resonance of the inductor, to thereby control operation of the control circuit.

7 Claims, 11 Drawing Sheets

(56) References Cited

U.S. PATENT DOCUMENTS

| | | | | |
|---|---|---|---|---|
| 2008/0278134 A1* | 11/2008 | Murata | ............... | H02M 1/32 |
| | | | | 323/284 |
| 2009/0097284 A1* | 4/2009 | Takei | ................. | H02M 1/32 |
| | | | | 363/56.1 |
| 2011/0085354 A1* | 4/2011 | Wang | ............ | H02M 1/4225 |
| | | | | 363/21.02 |
| 2011/0194314 A1* | 8/2011 | Morota | ........... | H02M 3/33507 |
| | | | | 363/21.15 |
| 2012/0033465 A1* | 2/2012 | Lee | ............... | H02M 3/33507 |
| | | | | 363/53 |
| 2014/0016363 A1* | 1/2014 | Chen | ............. | H02M 3/335 |
| | | | | 363/21.02 |
| 2014/0016364 A1* | 1/2014 | Chen | ............ | H02M 3/33507 |
| | | | | 363/21.02 |

FOREIGN PATENT DOCUMENTS

| JP | 2006-340535 A | 12/2006 |
|---|---|---|
| JP | 2008-125266 A | 5/2008 |
| JP | 2012-170218 A | 9/2012 |

\* cited by examiner

SWITCHING POWER SUPPLY APPARATUS

BACKGROUND OF THE INVENTION

1. Field of the Invention

The present invention relates to a switching power supply apparatus provided with an overload detecting circuit which is high in detection accuracy and simple in configuration.

2. Description of the Background Art

Current resonance type switching power supply apparatus represented by resonance type DC-DC converters or synchronous rectification boost type converters have been used as power supply apparatuses in various kinds of electronic equipment because they are highly efficient and suitable to be thinned. This kind of switching power supply apparatus is typically provided with a protective function by which an overload state of the switching power supply apparatus is detected and ON-driving of switching elements such as IGBTs (insulated-gate bipolar transistors) or MOS-FETs (metal-oxide-semiconductor field-effect transistor) are stopped, so that a load, the switching elements, etc. can be protected.

In the background art, the aforementioned detection of overload depends on monitoring the output power of the switching power supply apparatus, for example, on the secondary side of an isolation transformer thereof. However, the switching power supply apparatus provided with the overload detecting circuit on the secondary side of the isolation transformer has a large-scale configuration. In addition, it cannot be denied that the configuration causes increase in the cost of the switching power supply apparatus. Therefore, there has been heretofore proposed that a load state is monitored on the primary side of the isolation transformer, for example, as disclosed in U.S. Pat. No. 6,087,782 or Japanese Patent No. JP-A-2012-170218.

Specifically, U.S. Pat. No. 6,087,782 suggests that, in a DC-DC converter provided with switching elements which switch DC power to control a current flowing into an isolation transformer, effective electric power supplied to a load is obtained from an integrated value of the product of a VS voltage generated at one end of a primary winding in the isolation transformer and a resonance current flowing into the primary winding of the isolation transformer so that the load state can be detected based on the obtained effective electric power. On the other hand, JP-A-2012-170218 discloses a technique in which the load state is detected based on an average value of the resonance current flowing into the isolation transformer.

In the technique disclosed in U.S. Pat. No. 6,087,782, it cannot be denied that the circuit scale for computing the aforementioned effective electric power becomes large. Moreover, when the detection accuracy of the VS voltage and the resonance current and the calculation accuracy in an integrating circuit are taken into consideration, it is difficult to detect an overload state with high accuracy. In addition, in the technique disclosed in JP-A-2012-170218, there is a problem that the circuit scale becomes large because an averaging circuit, a multiplying circuit, etc. are necessary for averaging the resonance current.

SUMMARY OF THE INVENTION

The present invention has been accomplished in consideration of such circumstances. An object of the invention is to provide a switching power supply apparatus provided with an overload detecting circuit which has a simple configuration and which can detect an overload with high accuracy without incurring an increase in the scale of the circuit configuration.

The invention pays attention to the following point. That is, a resonance current flowing into a primary winding of an isolation transformer forming a resonant circuit, or into a resonance reactor in a switching power supply apparatus represented by a current resonance type DC-DC converter or a synchronous rectification boost type converter, contains an excitation current and a load current. In addition, the invention also pays attention to the following points. That is, when there is no load, a predetermined excitation current for retaining a gain for driving switching elements flows to generate a resonance voltage. As the load is heavier, the load current increases to thereby increase the resonance voltage. The invention particularly pays attention to the following point. That is, a peak value of the resonance voltage increases in proportion to the size (weight) of the load, for example, as shown in FIG. 1.

Therefore, in order to achieve the aforementioned object, a switching power supply apparatus according to the invention includes:

a current resonance type power converting device body which switches DC input power through a first switching element to store the DC input power in an inductor and which transfers the power stored in the inductor to an output capacitor through a second switching element by use of resonance of the inductor to thereby obtain DC output power;

a drive control circuit which drives the first and second switching elements to turn ON the first and second switching elements alternately to resonate the inductor; and an overload detecting circuit which detects a load state of the power converting device body based on a peak value or an effective value of a resonance voltage generated due to the resonance of the inductor to thereby control operation of the drive control circuit.

Incidentally, for example, the power converting device body is made of a resonance type DC-DC converter. Specifically, the resonance type DC-DC converter is provided with a series resonant circuit which is formed by leakage inductance of an isolation transformer, and a capacitor through which a primary winding of the isolation transformer is connected to a DC voltage source. Further, the resonance type DC-DC converter is provided with the first switching element and the second switching element. The first switching element is driven by the drive control circuit so that an input voltage from the DC input voltage source can be applied to the series resonant circuit when the first switching element is ON. The second switching element is connected in parallel to the series resonant circuit. When the first switching element is OFF, the second switching element is driven to turn ON by the drive control circuit so as to form a current path of the series resonant circuit. The resonance type DC-DC converter has a configuration in which electric power generated on the secondary winding side of the isolation transformer is rectified by a diode, and the electric power rectified by the diode is smoothened and outputted by the output capacitor. The resonance type DC-DC converter also has a configuration in which the peak value or the effective value of the resonance voltage is detected, for example, based on a voltage generated in an auxiliary winding of the isolation transformer or based on a voltage obtained by resistive division or capacitive division performed on a voltage generated in the primary winding of the isolation transformer.

In addition, for example, the power converting device body is made of a synchronous rectification boost type converter. Specifically, the synchronous rectification boost type converter is provided with the first switching element and the second switching element. The first switching element is connected to a DC voltage source through a resonance reactor and driven by the drive control circuit so that an input voltage from the DC voltage source can be applied to the resonance reactor when the first switching element is ON. When the first switching element is OFF, the second switching element is driven to turn ON by the drive control circuit so as to transfer electric power energy stored in the resonance reactor to the output capacitor. The resonance type DC-DC converter has a configuration in which the peak value or the effective value of the resonance voltage can be detected, for example, based on a voltage generated in an auxiliary winding of the resonance reactor.

It will be sufficient if the overload detecting circuit is arranged to detect an overload in synchronization with ON-driving of the first switching element or ON-driving of the second switching element and from a resonance voltage generated at that time.

According to the switching power supply apparatus configured as described above, paying attention to the fact that a resonance current in the inductor is constituted by a load current and an excitation current, the load state of the power converting device body is detected based on a peak value or an effective value of a resonance voltage generated due to resonance of the inductor. Thus, the load state can be detected simply and with high accuracy. In addition, the load state can be detected simply without requiring any complicated calculation processing on the primary winding side of the isolation transformer as in the background art. Accordingly, it is possible to obtain effects including an effect that the switching power supply apparatus provided with the overload detecting circuit can be constructed inexpensively.

DETAILED DESCRIPTION OF THE INVENTION

Current resonance type switching power supply apparatus according to embodiments of the invention will be described below with reference to the drawings.

Figure 1:
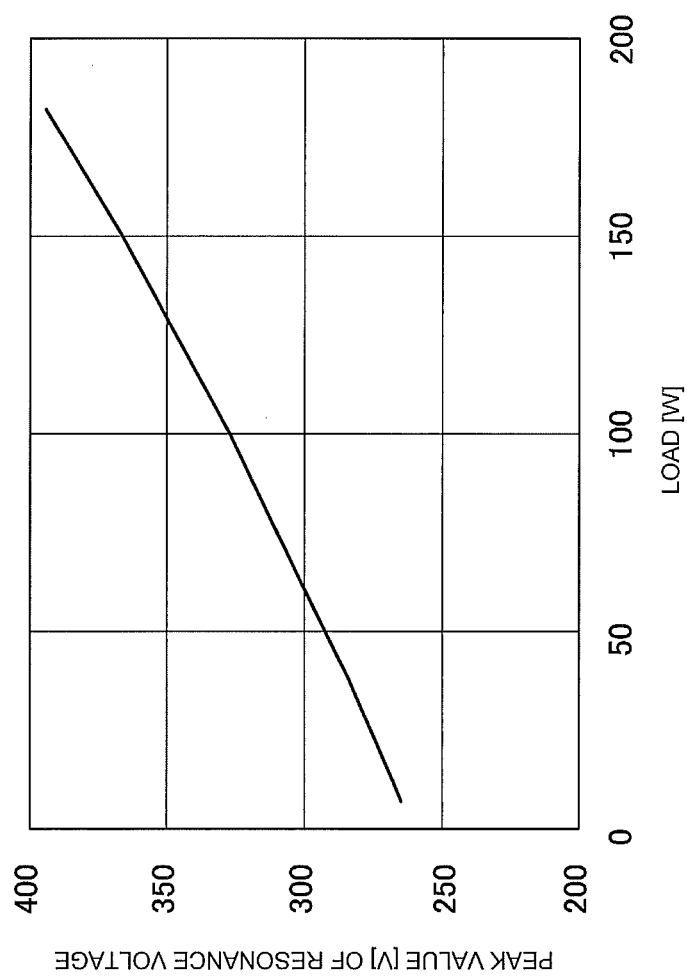
FIG. 1 is a graph, showing the relation between the size of a load and a peak value of a resonance voltage, that is the basis of the invention.
Figure 2:
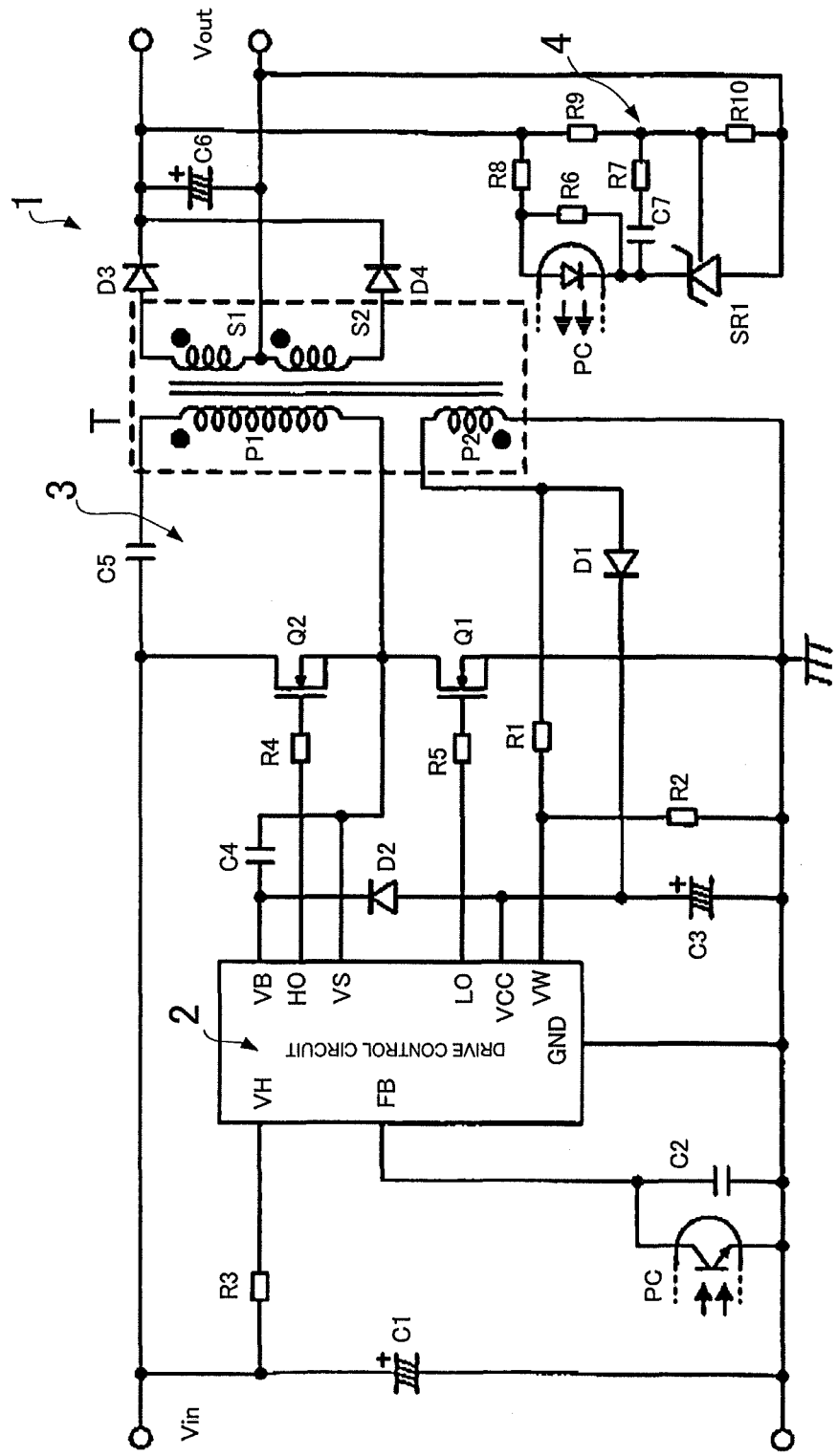
FIG. 2 is a schematic configuration diagram of a switching power supply apparatus according to a first embodiment of the invention.

FIG. 2 is a schematic configuration view of a current resonance type switching power supply apparatus (DC-DC converter) according to a first embodiment of the invention. This switching power supply apparatus 1 is mainly constituted by a series resonant circuit, which is formed by leakage inductance (leakage inductance) of an isolation transformer T, and a capacitor C5 through which a primary winding P1 of the isolation transformer T is connected to a DC input voltage source. A first switching element Q1 connected in series with the primary winding P1 of the isolation transformer T is driven to turn ON by a drive control circuit (power supply IC) 2 performing a separately-excited oscillation operation, so as to apply an input voltage Vin from the DC input voltage source to the series resonant circuit. In addition, a second switching element Q2 connected in parallel with the series resonant circuit is driven to turn ON by the drive control circuit 2 when the first switching element Q1 is OFF, so as to form a resonance current path of the series resonant circuit. For example, these first and second switching elements Q1 and Q2 are made of high voltage n-type MOS-FETs.

Electric power generated in a secondary winding S1, S2 of the isolation transformer T is rectified and smoothened through an output circuit including a diode D3, D4 and an output capacitor C6, and supplied as an output voltage Vout to a load (not shown). A resonance type power converting device body 3 is formed by these circuit portions. The output voltage Vout, specifically a deviation between the output voltage Vout and an output voltage set value, is detected by an output voltage detecting circuit 4 and fed back as a feed-back (FB) voltage to the drive control circuit 2 through a photo-coupler (PC).

The FB voltage fed back to the drive control circuit 2 is served for pulse width modulation of an output control signal for driving the first and second switching elements Q1 and Q2 to turn them ON/OFF. Thus, the output voltage Vout is stabilized (made constant). Incidentally, DC power supplied from the DC voltage source is generally filtered through an input capacitor C1 and then supplied as an input voltage Vin to the switching power supply apparatus 1.

In addition, a voltage generated in an auxiliary winding P2 of the isolation transformer T is applied as a drive power source voltage VCC of the drive control circuit 2 to the drive control circuit 2 through a rectifier circuit including a diode D1 and a capacitor C3. In addition, the voltage generated in the auxiliary winding P2 is divided through resistors R1 and R2 to be inputted to an auxiliary winding voltage detecting terminal VW of the drive control circuit 2 to be thereby served for detection of a load state based on a peak value of a resonance voltage, which will be described later.

Figure 3:
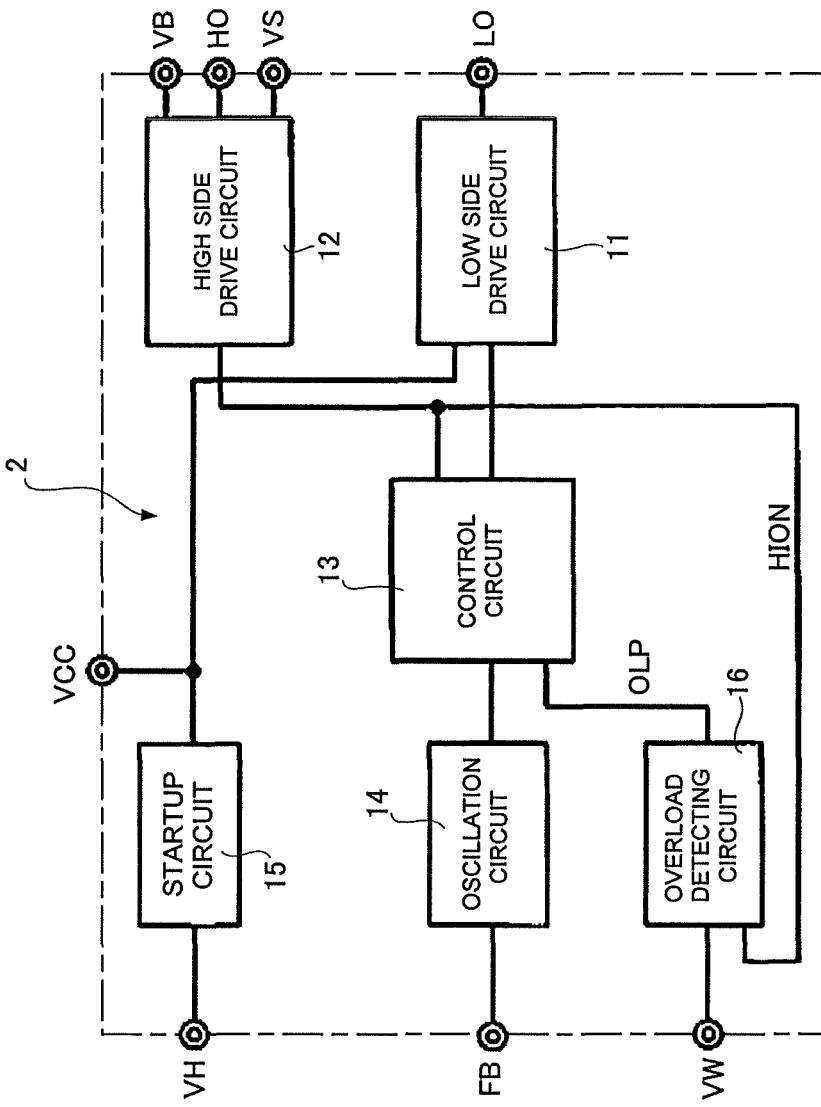
FIG. 3 is a diagram showing a schematic configuration of a drive control circuit in the switching power supply apparatus shown in FIG. 2.

As shown in FIG. 3 which shows a schematic configuration of a main part of the drive control circuit 2, the drive control circuit 2 includes a low side drive circuit 11 for driving the first switching element Q1 to turn it ON/OFF, and a high side drive circuit 12 for driving the second switching element Q2 to turn it ON/OFF. On receiving drive control signals from a control circuit 13, the drive circuits 11 and 12 drive the first and second switching elements Q1 to turn them ON/OFF reciprocally. Thus, the drive circuits 11 and 12 play a role in controlling a current flowing into the primary winding P1 of the isolation transformer T.

Incidentally, the control circuit 13 generates drive control signals for driving the drive circuits 11 and 12 respectively, based on a pulse signal given from an oscillation circuit 14. Particularly, the oscillation circuit 14 modulates (using pulse-width modulation, i.e., PWM modulates) the pulse width of the pulse signal in accordance with the FB voltage fed back from the output voltage detecting circuit 4 to thereby control operation of the control circuit 13. Thus, ON periods of the first and second switching elements Q1 and Q2 are defined respectively. Due to the control of the ON periods of the first and second switching elements Q1 and Q2 using the pulse width modulation, the output voltage Vout resulting from the switching operations of the switching elements Q1 and Q2 is controlled to be equal to the output voltage set value. Incidentally, the oscillation circuit 14 may generate a pulse signal (a pulse-frequency modulation, or PFM, signal) of a frequency corresponding to the FB voltage, as the drive control signal, in place of the PWM signal.

Incidentally, the drive control circuit 2 starts operation under a startup circuit 15 supplied with the input voltage Vin, at a startup time when the switching power supply apparatus is powered on. After a voltage is generated in the auxiliary winding P2 of the isolation transformer T in accordance with ON/OFF-driving of the switching elements Q1 and Q2, the drive control circuit 2 receives the voltage generated in the auxiliary winding P2 to continue the operation, as described above.

In addition, an overload detecting circuit 16 provided in the drive control circuit 2 detects a load state from a peak value of a resonance voltage Vx detected through the auxiliary winding voltage detecting terminal VW. Particularly, the overload detecting circuit 16 detects the peak value of the resonance voltage Vx as an overload when the peak value of the resonance voltage Vx exceeds a predetermined reference voltage Vref. On detecting the overload, the overload detecting circuit 16 outputs an overload detecting signal OLP to stop the operation of the control circuit 13. In this manner, ON-driving of the switching elements Q1 and Q2 performed by the drive circuits 11 and 12 is stopped. That is, on detecting an overload, the overload detecting circuit 16 stops ON-driving of the switching elements Q1 and Q2. Thus, the overload detecting circuit 16 plays a role in protecting the load (not shown) connected to the switching power supply apparatus and protecting the switching elements Q1 and Q2.

Figure 4:
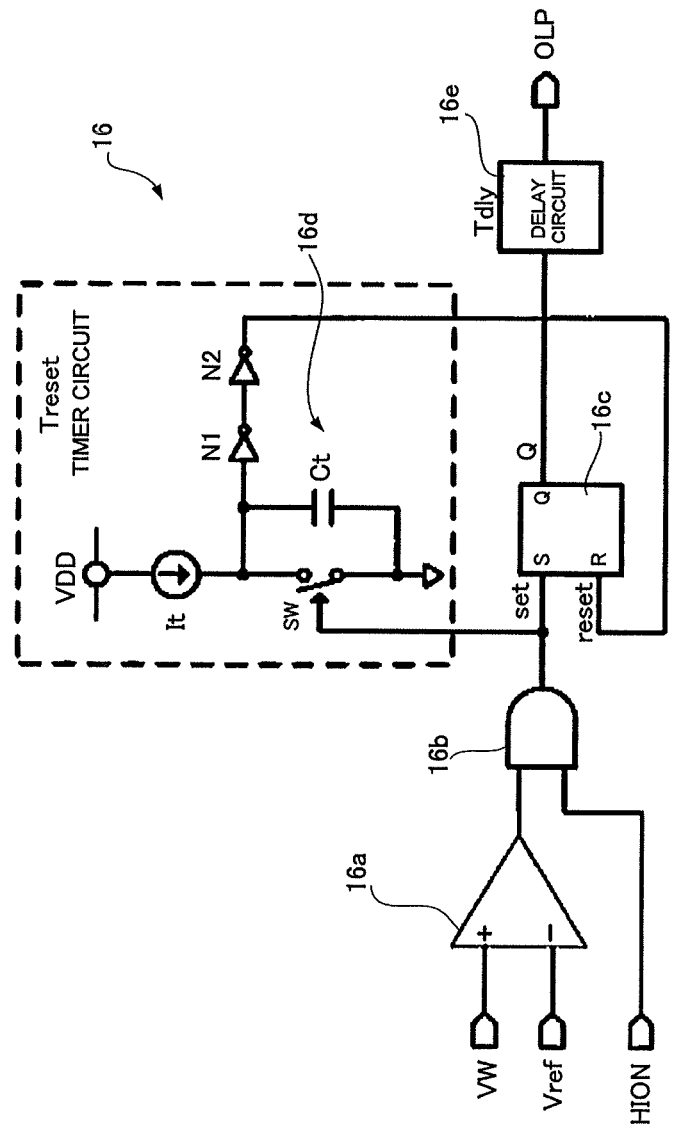
FIG. 4 is a diagram showing a configuration example of an overload detecting circuit provided in the drive control circuit.

The overload detecting circuit 16 playing this role is designed to detect the peak value of the resonance voltage Vx when the second switching element Q2 (the high side) is driven to turn ON, for example, as shown in FIG. 4. Specifically, the overload detecting circuit 16 compares the resonance voltage Vx detected through the auxiliary winding voltage detecting terminal VW with the predetermined reference voltage Vref in a comparator 16a successively. On receiving a drive control signal HION driving the high side drive circuit 12, a gate circuit (AND circuit) 16b turns active. An output of the comparator 16a is applied to a flip flop 16c through the active gate circuit (AND circuit) 16b to set the flip flop 16c. Thus, the overload detecting signal OLP is generated as will be described later.

Figure 5:
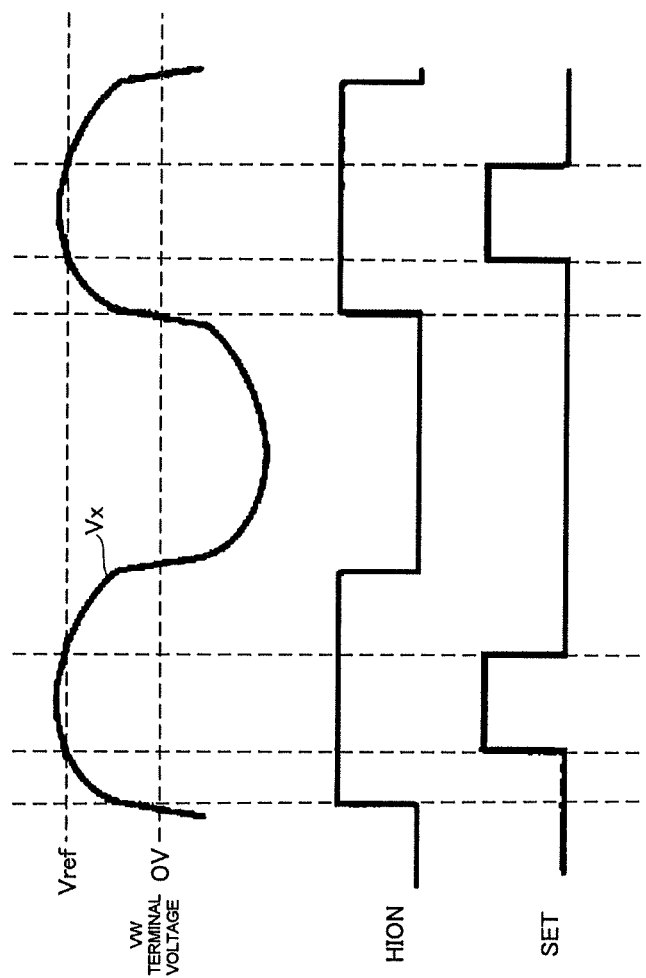
FIG. 5 is a chart showing a basic operation of the overload detecting circuit.

That is, the overload detecting circuit 16 is designed to set the flip flop 16c when the resonance voltage Vx exceeds the reference voltage Vref in an ON-operation period of the second switching element Q2 as shown in FIG. 5 which shows an operating timing of the overload detecting circuit 16. Incidentally, the flip flop 16c is reset after a lapse of a constant time Treset by a timer circuit 16d which is started up when the output of the gate circuit (AND circuit) 16b is inverted to an [L] level.

Incidentally, the timer circuit 16d is provided with a capacitor Ct which is charged with a constant current by a constant current source It, a switch SW which is operated and turned ON upon reception of the output of the gate circuit (AND circuit) 16b to discharge the capacitor Ct for resetting (initializing) the capacitor Ct, and an inverting circuit (NOT circuit) N1 performing an inversion operation when the charging voltage of the capacitor Ct exceeds a predetermined threshold voltage. The charging time until the charging voltage of the capacitor Ct exceeds the threshold voltage is the constant time Treset. Configuration is made so that the output of the inverting circuit N1 can be inverted in a second inverting circuit (NOT circuit) N2 to reset the flip flop 16c.

Figure 6:
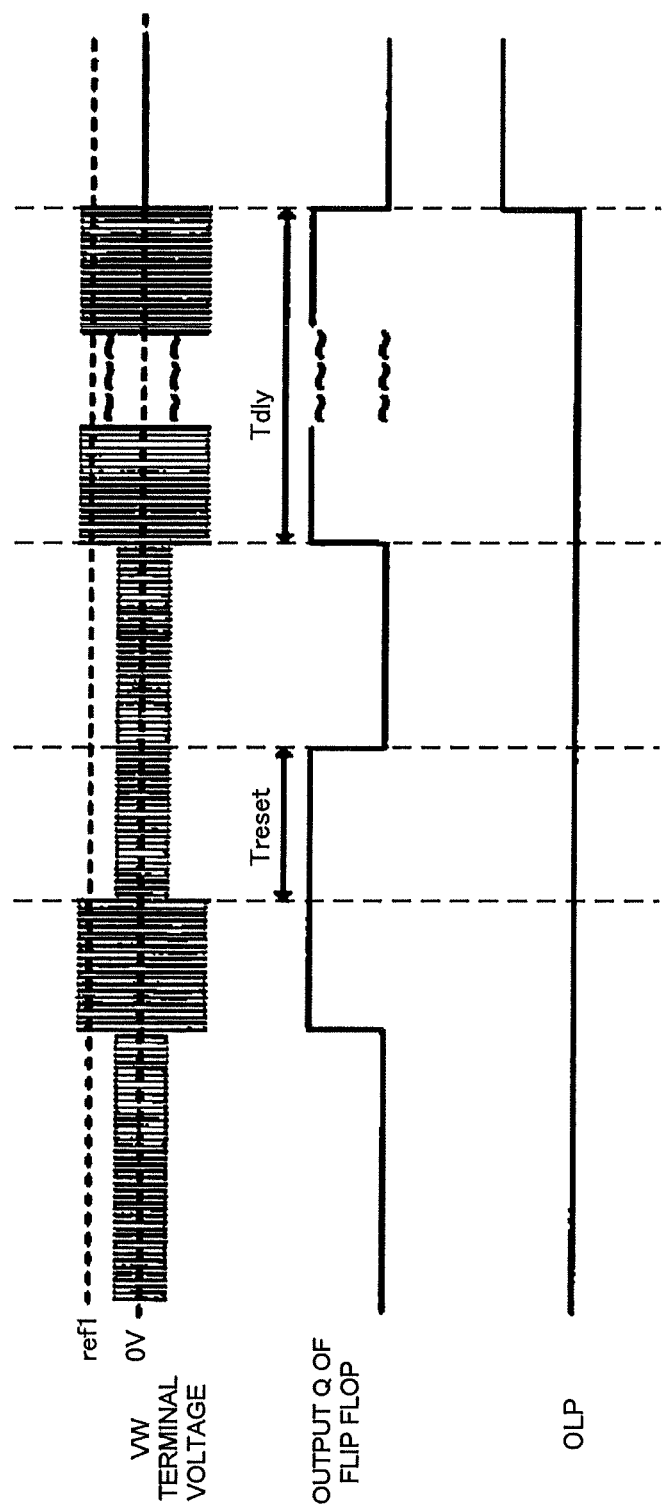
FIG. 6 is a chart showing an overload detecting operation performed by the overload detecting circuit.

Accordingly, the timer circuit 16d sets the flip flop 16c at the timing when the resonance voltage Vx exceeds the reference voltage Vref as shown in FIG. 6 which shows an operation timing of the timer circuit 16d. When the resonance voltage Vx then falls below the reference voltage Vref, the timer circuit 16d resets the flip flop 16c after a lapse of the constant time Treset. The output of the flip flop 16c set/reset thus is controlled to be delayed and sent out through a delay circuit 16e in which a predetermined delay time Tdly is set. Specifically, the delay circuit 16e is designed so that the overload detecting signal OLP can be generated on condition that the output of the flip flop 16c continues over the delay time Tdly.

When the state in which the resonance voltage Vx exceeds the reference voltage Vref continues over the delay time Tdly as shown in FIG. 6, the overload detecting circuit 16 configured thus determines the state as an overload state and outputs the overload detecting signal OLP accordingly. This overload detecting signal OLP is given to the control circuit 13 so as to make control to stop the driving of the low side drive circuit 11 and the high side drive circuit 12. As a result, when the constant time has passed (the delay time Tdly has passed) since the detection of the overload, ON-driving of the first and second switching elements Q1 and Q2 is stopped and a protection operation against the overload is executed.

According to the switching power supply apparatus 1 configured as described above, the load state is determined paying attention to the resonance current in the resonance type power converting device body 3 and paying attention to the peak value of the resonance voltage generated due to the resonance current. Accordingly, overload detection can be executed simply and with high accuracy. Particularly, the overload state can be detected simply and with high accuracy without execution of any calculation processing as introduced in the aforementioned U.S. Pat. No. 6,087,782 and JP-A-2012-170218. Accordingly, when the drive control circuit 2 provided with the overload protection function is implemented as a power source IC, the circuit configuration thereof can be made simple and the manufacturing cost thereof can be reduced. Accordingly, practical advantages of the drive control circuit 2 can be enormous.

Figure 7:
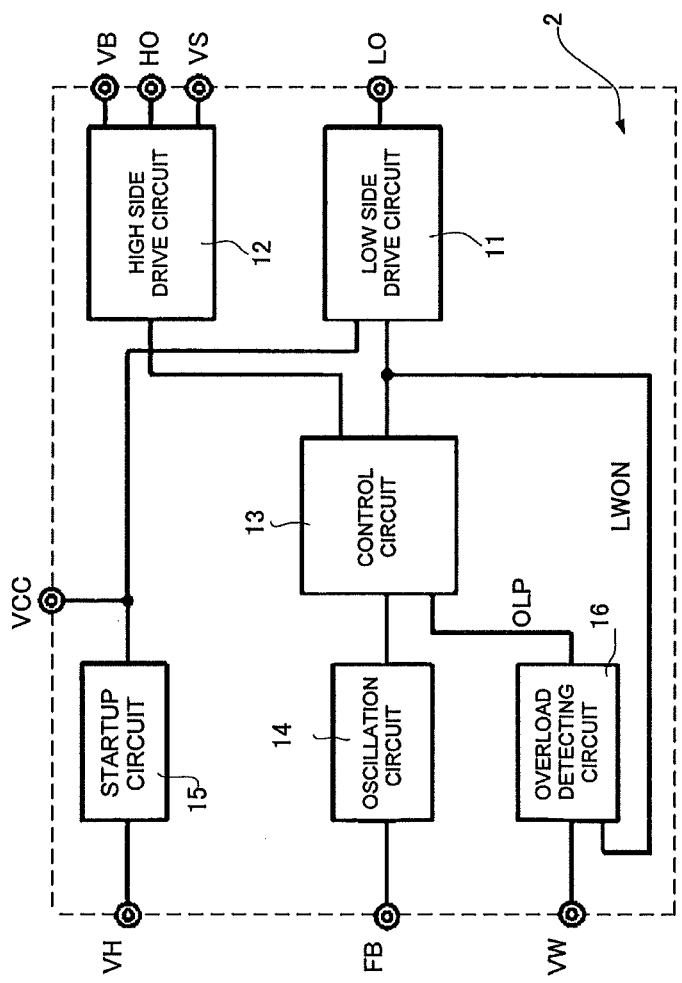
FIG. 7 is a diagram showing another configuration example of the drive control circuit.

Incidentally, the case where an overload is detected in synchronization with the drive control signal HION for the high side drive circuit 12 which drives the second switching element Q2 to turn it ON has been described by way of example in the aforementioned embodiment. However, since the resonance current in the resonance type power converting device body 3 is generated in accordance with complementary ON/OFF operations of the switching elements Q1 and Q2, the resonance current has symmetry. Accordingly, an overload may be detected in synchronization with a drive control signal LWON for the low side drive circuit 11 which drives the first switching element Q1 to turn it ON, for example, as shown in FIG. 7.

Figure 8:
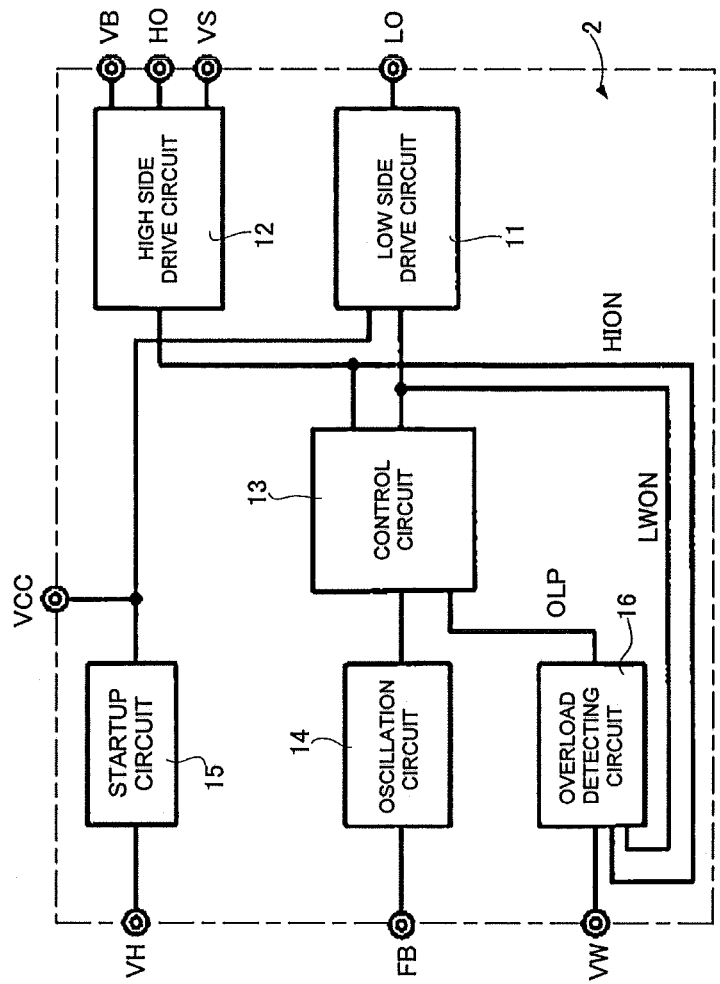
FIG. 8 is a diagram showing further another configuration example of the drive control circuit.

Further, an overload may be detected in synchronization with the drive control signals LWON and HION for the drive circuits 11 and 12 respectively, as shown in FIG. 8. When the overload detecting circuit 16 is configured so that an overload can be detected based on both a positive resonance current (resonance voltage) and a negative resonance current (resonance voltage) having symmetry thus, detection accuracy of the overload can be increased easily. Further, the time until overload detection can be shortened so that a protection operation against the overload can be executed quickly.

The configuration in which the peak value of the resonance voltage can be detected based on the voltage generated in the auxiliary winding P2 of the isolation transformer T has been described by way of example in the aforementioned embodiment. However, it is a matter of course that an overload may be detected directly from the resonance voltage generated in the primary winding P1 of the isolation transformer T in accordance with ON/OFF operations of the switching elements Q1 and Q2.

Figure 9:
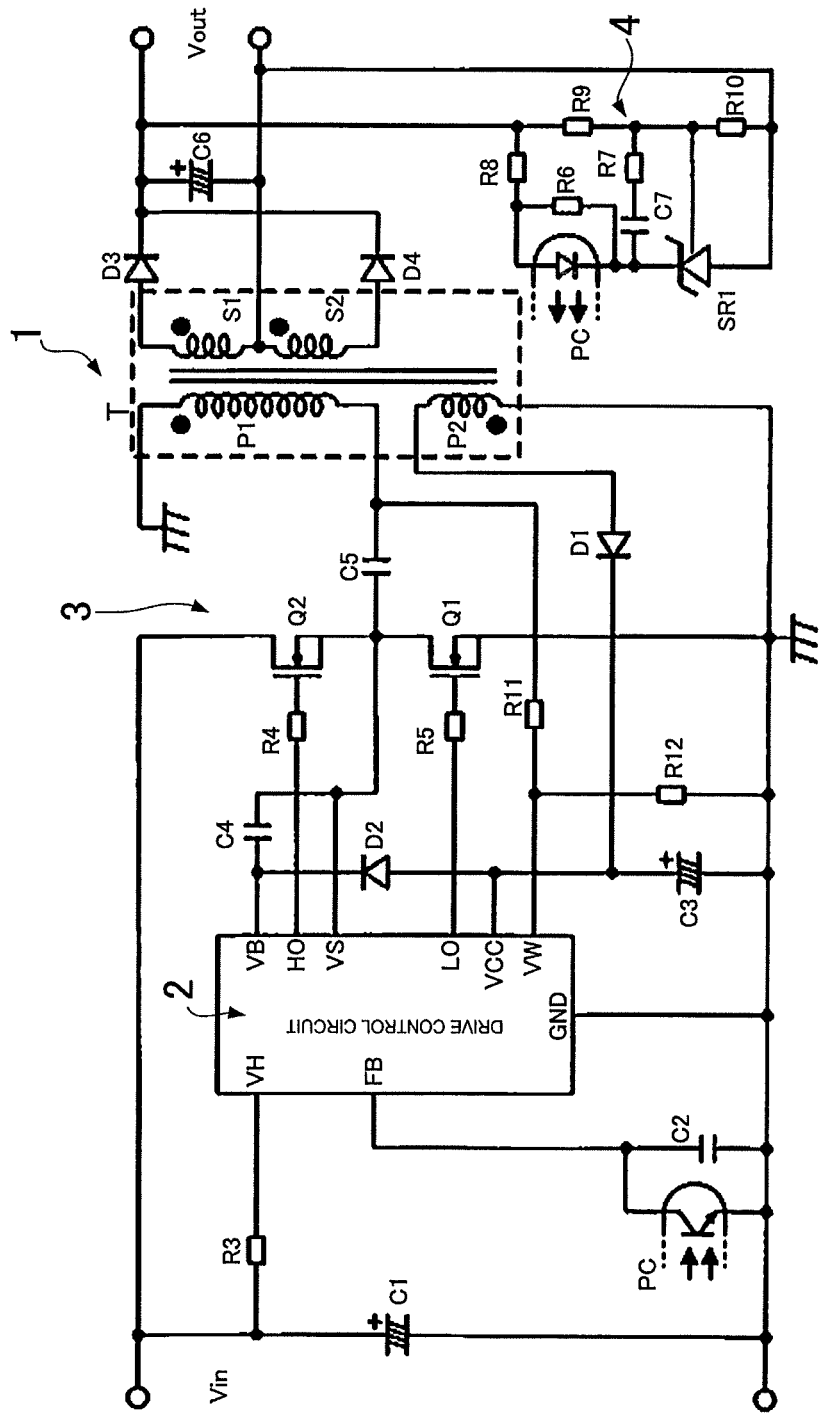
FIG. 9 is a schematic configuration diagram of a switching power supply apparatus according to a second embodiment of the invention.
Figure 10:
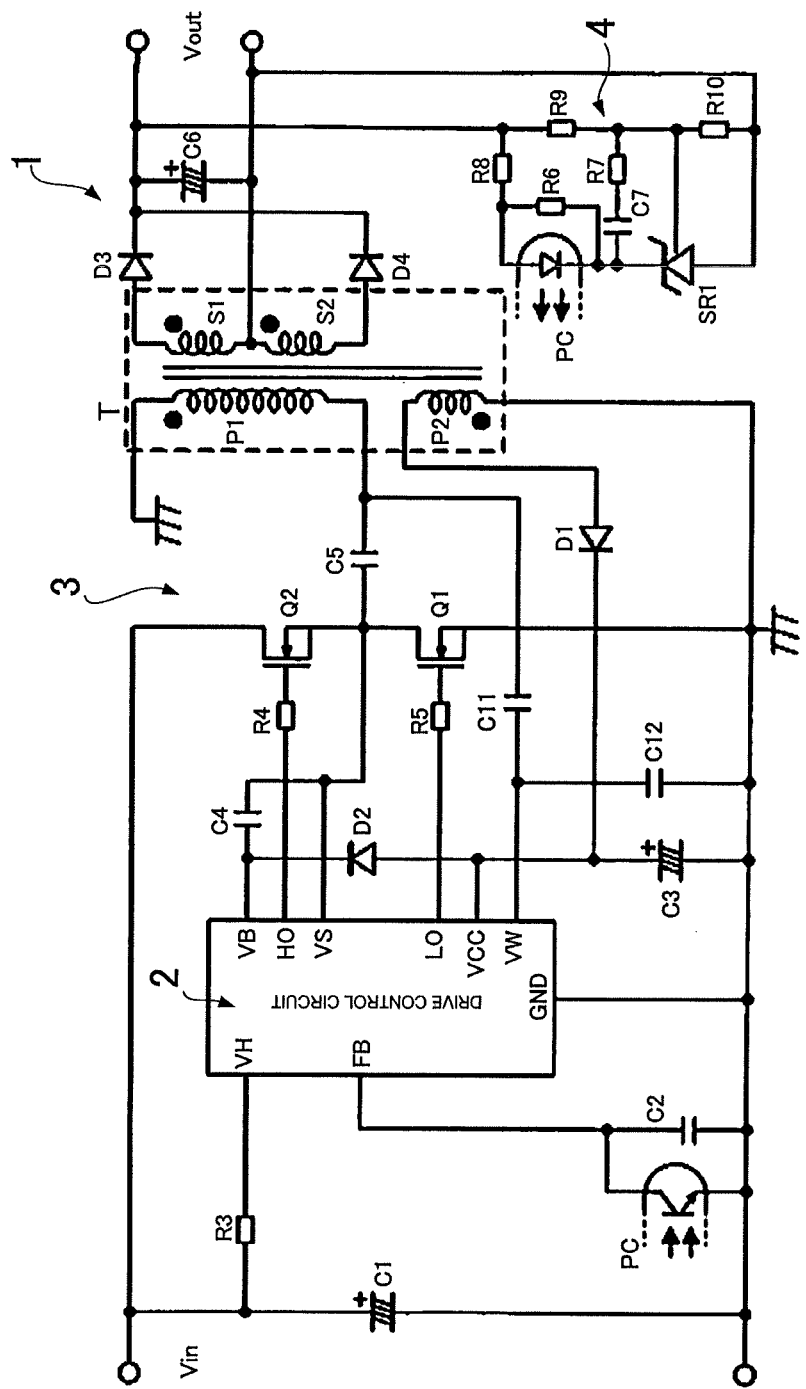
FIG. 10 is a schematic configuration diagram of a switching power supply apparatus according to a third embodiment of the invention.

In this case, configuration may be arranged so that a resonance voltage which is generated in the primary winding P1 of the isolation transformer T can be resistively divided through series-connected resistors R11 and R12 and detected, as in a schematic configuration of a switching power supply apparatus 1 according to a second embodiment of the invention shown in FIG. 9. Alternatively, configuration may be arranged so that a resonance voltage which is generated in the primary winding P1 of the isolation transformer T can be capacitively divided through series-connected capacitors C11 and C12 and detected, as in a schematic configuration of a switching power supply apparatus 1 according to a third embodiment of the invention shown in FIG. 10.

Thus, the same effect as that in the previous embodiment can be obtained even in the configuration in which the resonance voltage Vx generated in the primary winding P1 of the isolation transformer T is divided and detected to determine the peak value of the detected resonance voltage Vx. Incidentally, when such a configuration is used, it will be sufficient if the auxiliary winding P2 of the isolation transformer T is used as the source for supplying the power source voltage VCC to the drive control circuit 2.

Figure 11:
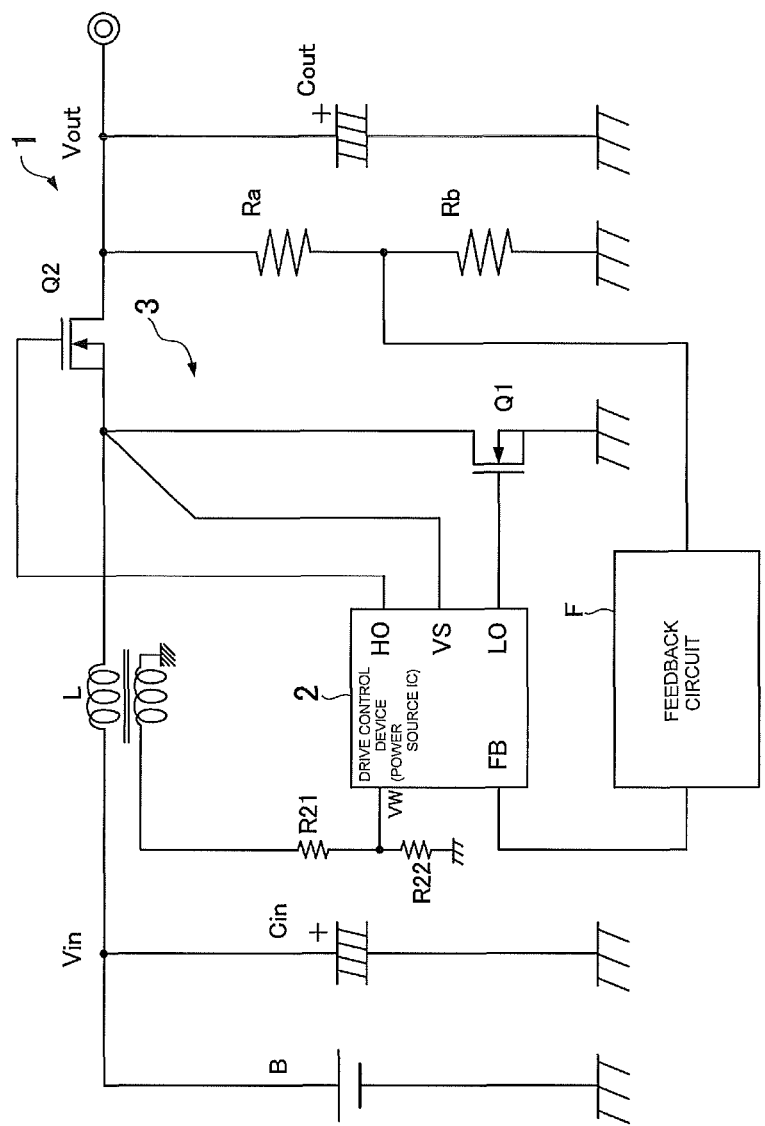
FIG. 11 is a schematic configuration diagram of a switching power supply apparatus according to another embodiment of the invention.

Incidentally, the invention is not limited to the aforementioned embodiments. For example, the invention may be applied in the same manner to the case where a synchronous rectification boost type converter is used as the resonance type power converting device body 3. For example, as shown in FIG. 11, the synchronous rectification boost type converter is provided with the first switching element Q1 which is connected to a DC voltage source through a resonance reactor L and which is driven by the drive control circuit 2 to apply the input voltage Vin from the DC voltage source to the resonance reactor L when the first switching element Q1 is ON. Further, the synchronous rectification boost type converter is provided with the second switching element Q2 which is driven to turn ON by the drive control circuit 2 when the first switching element Q1 is OFF, so as to transfer electric power energy stored in the resonance reactor L to an output capacitor.

When the invention is applied to such a synchronous rectification boost type converter (the resonance type power converting device body 3), for example, the reference voltage Vx generated in an auxiliary winding of the resonance reactor L may be divided through resistors R21 and R22 and inputted to the drive control circuit 2 so that the load state can be detected based on a peak value of the resonance voltage Vx. In addition, although the load state is detected based on the peak value of the resonance voltage Vx here, it is a matter of course that configuration may be arranged so that the load state can be detected from an effective value of the resonance voltage Vx. Besides, the invention may be modified variously and carried out without departing from the scope and spirit of the invention.

What is claimed is:

1. A switching power supply apparatus, comprising:
   a power converting device body including a resonance type DC-DC converter that has:
      a series resonant circuit, formed by leakage inductance of an isolation transformer and a capacitor through which a primary winding of the isolation transformer is connected to a DC voltage source,
      a first switching element, which is drivable by a control circuit to thereby cause an input voltage from the DC input voltage source to be applied to the series resonant circuit when the first switching element is ON,
      a second switching element connected in parallel to the series resonant circuit, the second switching element being drivable to turn ON by the control circuit when the first switching element is OFF, so as to form a current path of the series resonant circuit,
      a diode configured to rectify electric power generated by a secondary winding of the isolation transformer; and
      an output capacitor configured to smoothen and output the electric power rectified by the diode;
   the control circuit configured to drive the first and second switching elements, via a first drive control signal and a second drive control signal respectively, to alternately turn ON or OFF the first and second switching elements, to thereby resonate the series resonant circuit; and
   an overload detecting circuit including
      a comparator that receives a resonance voltage that is generated from the resonance of the series resonant circuit and a predetermined reference voltage, and compares the resonance voltage and the predetermined reference voltage,
      a gate circuit that performs an AND operation on the first or second drive control signal and an output of the comparator,
      a timer circuit that receives an output of the gate circuit, and, in response to falling of the resonance voltage below the predetermined reference voltage, generates an output that delays the output of the gate circuit for a first predetermined time period, and
      a flip-flop having a set terminal receiving the output of the gate circuit and a reset terminal receiving the output of the timer circuit, so as to be
         set responsive to the resonance voltage exceeding the predetermined reference voltage, and
         reset after lapse of the first predetermined time period after the falling of the resonance voltage below the predetermined reference voltage, the overload detecting circuit being configured to stop operation of the control circuit upon determining that an output of the flip-flop continues to be in a set state over a second predetermined time period.

2. The switching power supply apparatus according to claim 1, wherein:
   the isolation transformer further includes an auxiliary winding; and
   the resonance voltage is detected based on a voltage generated in the auxiliary winding of the isolation transformer.

3. The switching power supply apparatus according to claim 1, wherein the resonance voltage is detected based on a voltage obtained by resistive division or capacitive division performed on a voltage generated in the primary winding of the isolation transformer.

4. The switching power supply apparatus according to claim 1, wherein the overload detecting circuit stops the operation of the control circuit in synchronization with ON-driving of the first switching element or ON-driving of the second switching element.

5. The switching power supply apparatus according to claim 1, wherein the overload detecting circuit further includes a delay circuit that receives the output from the flip-flop, and generates a signal to stop the operation of the control circuit by delaying the output of the flip-flop for the second predetermined time period.

6. The switching power supply apparatus according to claim 1, where the timer circuit includes
   a constant current source,
   a capacitor connected to the constant current source,
   a switch connected in parallel to the capacitor, and is controlled by the resonance voltage, and
   two serially-connected inverting circuits, connected to the capacitor, configured to perform two consecutive inversion operations when a charging voltage of the capacitor exceeds a predetermined threshold voltage.

7. The switching power supply apparatus according to claim 1, wherein the first predetermined time period is a constant time period.

* * * * *